United States Patent [19]

Adams et al.

[11] 4,401,262
[45] Aug. 30, 1983

[54] ENERGY SAVING THERMOSTAT WITH MEANS TO SHIFT OFFSET TIME PROGRAM

[75] Inventors: John T. Adams, Minneapolis; Marvin D. Nelson, St. Louis Park, both of Minn.

[73] Assignee: Honeywell Inc., Minneapolis, Minn.

[21] Appl. No.: 389,538

[22] Filed: Jun. 18, 1982

[51] Int. Cl.³ .............................................. G05D 23/00
[52] U.S. Cl. .................................... 236/46 R; 165/12; 236/47; 364/569
[58] Field of Search ................. 236/46 R, 47; 165/12; 307/141; 340/309.5; 364/569, 557, 505

[56] References Cited

U.S. PATENT DOCUMENTS

| | | |
|---|---|---|
| 3,526,887 | 6/1967 | Erni . |
| 3,925,775 | 12/1975 | Gay . |
| 4,001,599 | 1/1977 | Karklys . |
| 4,035,661 | 7/1977 | Carlson . |
| 4,041,325 | 8/1977 | Angott . |
| 4,050,020 | 9/1977 | Germer et al. . |
| 4,062,007 | 12/1977 | Scott . |
| 4,079,366 | 3/1978 | Wong . |
| 4,104,542 | 8/1978 | Karklys et al. ............... 307/141.4 X |
| 4,134,027 | 1/1979 | Scott et al. . |
| 4,136,392 | 1/1979 | Westphal et al. . |
| 4,162,036 | 7/1979 | Balduzzi et al. . |
| 4,162,610 | 7/1979 | Levine . |
| 4,166,975 | 9/1979 | Germer et al. . |
| 4,172,555 | 10/1979 | Levine . |
| 4,191,328 | 3/1980 | Isaacs et al. . |
| 4,200,910 | 4/1980 | Hall . |
| 4,204,196 | 5/1980 | Sveda . |
| 4,245,296 | 1/1981 | Small et al. ...................... 364/569 X |
| 4,298,946 | 11/1981 | Hartsell et al. ...................... 364/557 |

Primary Examiner—William E. Wayner
Attorney, Agent, or Firm—Clyde C. Blinn

[57] ABSTRACT

An energy saving thermostat having a selected offset temperature time period previously programmed with means to shift the time period ahead or backward.

8 Claims, 9 Drawing Figures

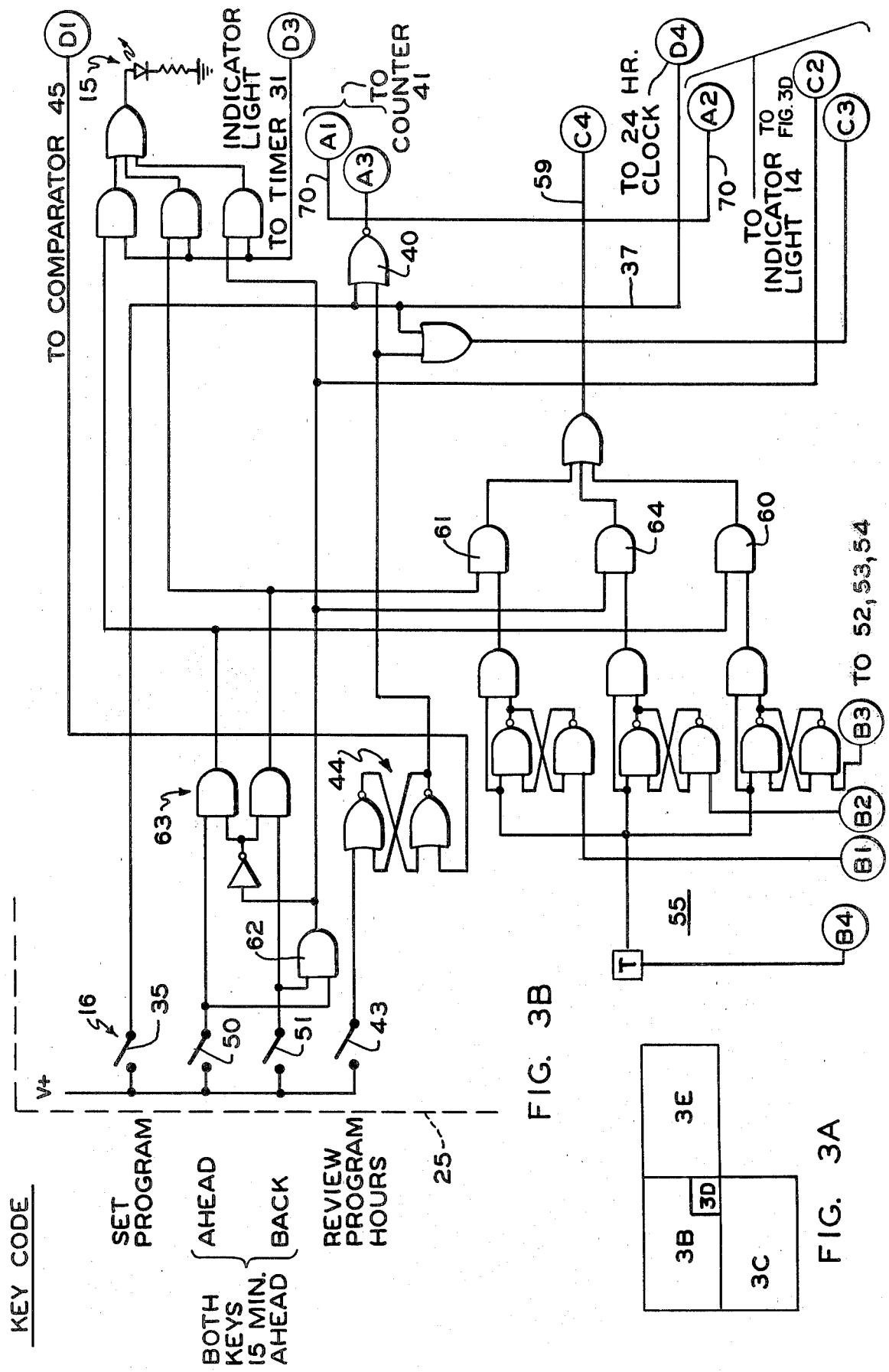

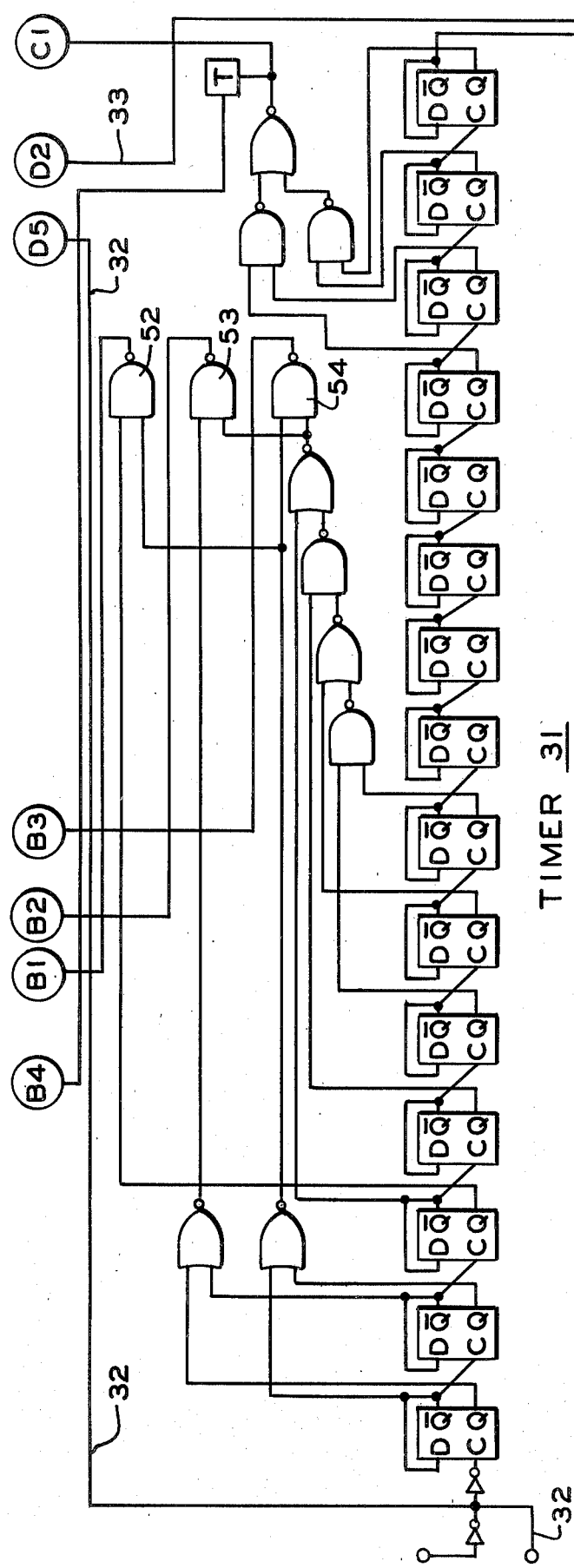
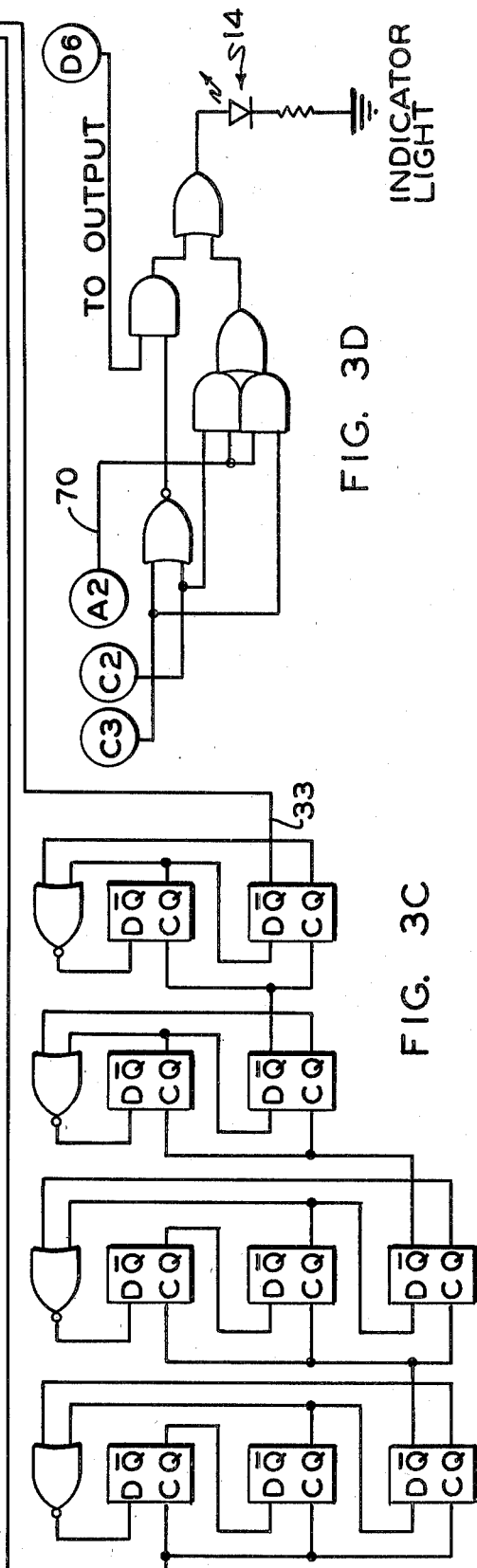
FIG. 3D
FIG. 3C

ENERGY SAVING THERMOSTAT WITH MEANS TO SHIFT OFFSET TIME PROGRAM

BACKGROUND AND SUMMARY OF THE INVENTION

Energy saving thermostats of the type disclosed in John T. Adams, et al, U.S. Pat. No. 4,316,577 for Energy Saving Thermostat issued Feb. 23, 1982, are presently being marketed by the applicants' assignee in the form of the T8100A Microelectronic Chronotherm Fuel Saver Thermostat. In such a thermostat, the normal control temperature can be offset by a selected amount during an energy saving time period of the day. To program the energy saving time period, the home owner pushes a button at the time energy saving time period is to begin to close a switch which stores a time in hours depending upon the number of flashes of an indicator light. For example, if an eight hour energy saving time period offset of the normal temperature is to begin at 10:00 P.M., the home owner would wait until 10:00 P.M. to push the program button and store in the memory the eight hour period of time. Each twenty-four hours, the thermostat controls at an energy saving temperature which is offset from the normal control temperature for the eight hour period until a new energy saving time period was selected and stored in the memory.

The present invention is concerned with an improvement to such a thermostat to provide for changing or readjusting the starting time for the selected time period. The readjustment of the time period can be made either back or ahead at any time by pushing one or more buttons to close associated switches.

DESCRIPTION OF THE PREFERRED EMBODIMENT

Figure 1:
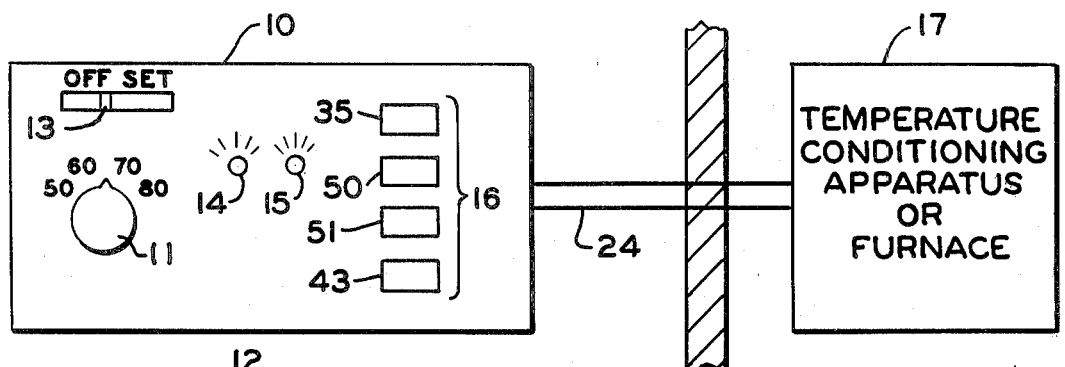
FIG. 1 is a schematic representation showing the energy saving thermostat connected to a temperature conditioning apparatus.

Referring to FIG. 1, a thermostat 10 is shown connected to a temperature conditioning apparatus or furnace 11. Thermostat 10 is of the type disclosed in the mentioned John T. Adams, et al, patent, having a temperature control point or set point selector 11 for selecting a temperature to be controlled in a space 12. A temperature setback, offset or deviation selector switch 13 determines the deviation from the normal temperature control point selected by member 11 during preselected offset time periods. The thermostat has a pair of indicator means or LED lights 14 and 15 and a plurality of switch buttons 16, the operation of which will be described later.

Figure 2:
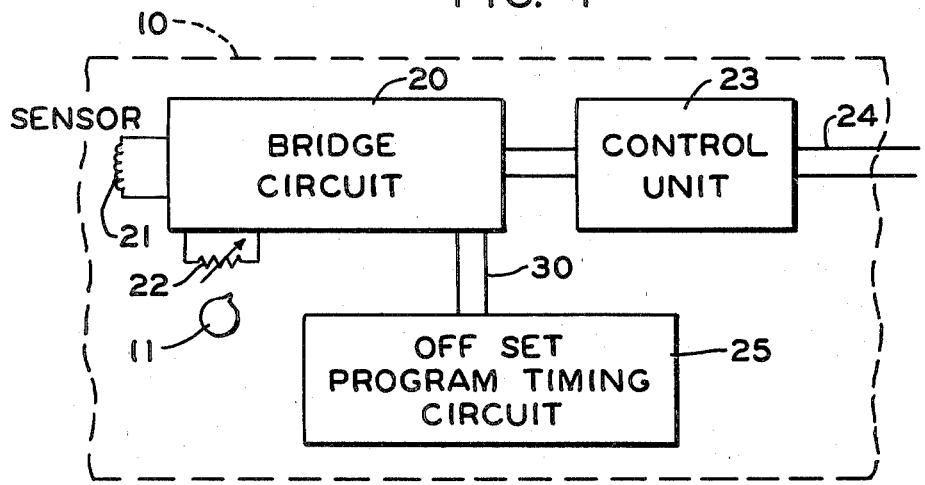
FIG. 2 is a schematic representation of the various elements of the thermostat.

Referring to FIG. 2, thermostat 10 has a temperature control or bridge circuit 20 containing a temperature responsive resistance sensor 21 responsive to the temperature in space 12 and an adjustment potentiometer 22 controlled by member 11 to select the normal temperature to be controlled in the space. The bridge circuit 20 is connected to a control apparatus or unit 23 containing a switch or relay for switching an output at 24 adapted to be connected to temperature conditioning apparatus 17. Thermostat 10 also contains an offset program timing circuit 25 having an output 30 connected to the bridge circuit of the thermostat for selecting the preselected time period as established by the program timing circuit in which the offset temperature is to be maintained.

Figure 3E:
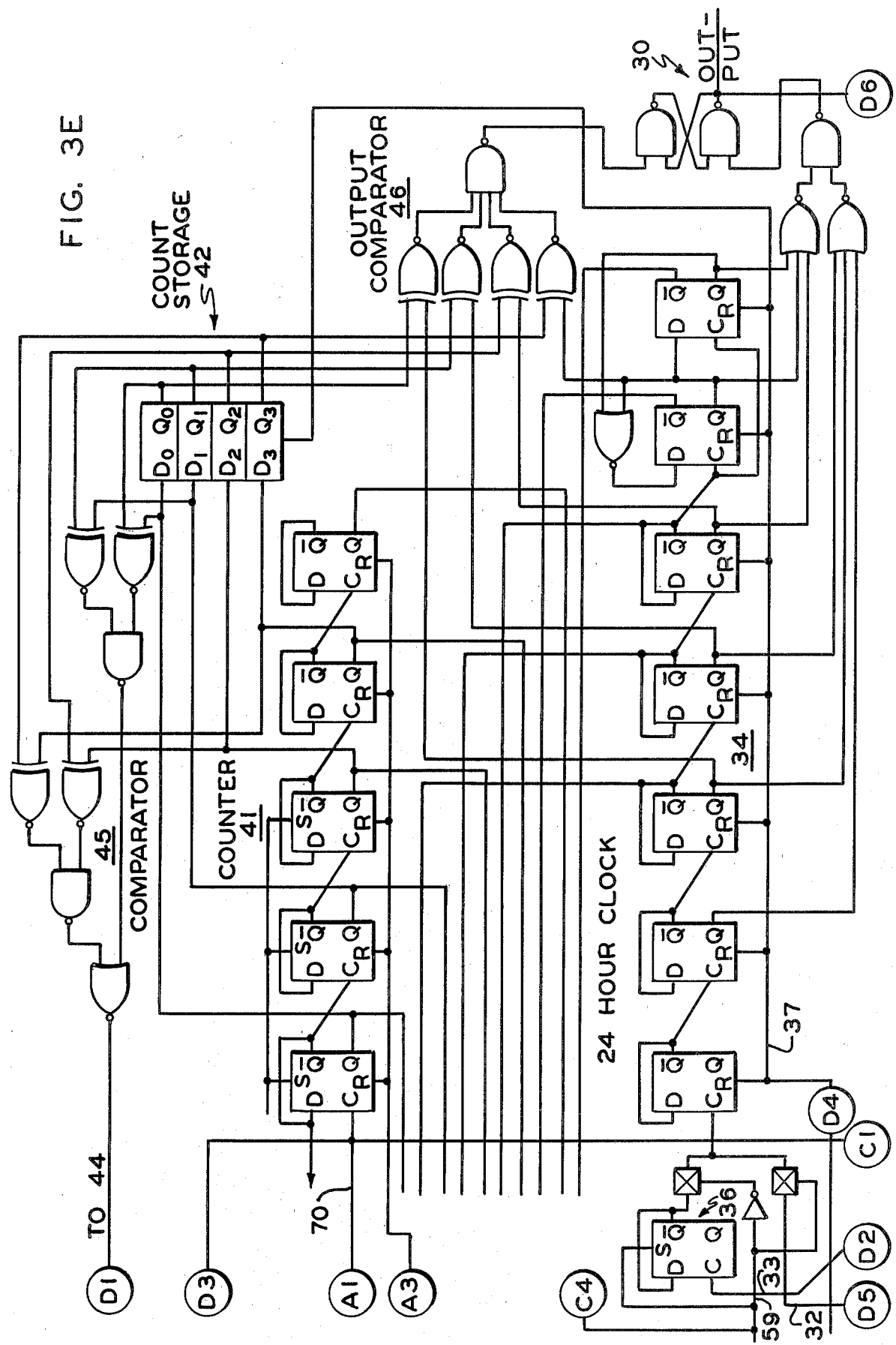
FIG. 3 is an electrical circuit drawing of the offset program timing circuit schematically shown in FIG. 2.

Referring to FIG. 3, program timing circuit 25 is shown with its output 30. The program timing circuit 25 has a conventional counter chain or timer 31 connected to a signal source 32 of 32,768 Hz. The timer has a normal output at 33 each 7.5 minutes (one pulse each half hour) connected to the input circuit 36 to drive a counter chain twenty-four hour clock 34 in fifteen minute interval steps through a twenty-four hour period of time to provide a pulse for each hour before it resets itself back to zero after 24 hours.

As with the John T. Adams patent disclosure, to set an offset program time or time interval for energy saving temperature, button or switch 35 of the bank of switches 16 shown in FIGS. 1 and 3, is closed to apply a reset signal at 37 to start the twenty-four hour clock from zero and to gate 40 to energize a counter 41. Simultaneously, indicator light 14 is energized each time an hour pulse is provided to counter 41 so that the home owner can count the pulses to indicate the number of hours of desired offset time. After releasing switch 35, the count in counter 41 is stored in the hours of energy saving memory or count storage 42.

Similar to the Adams patent disclosure, a program review button or switch 43 is closed to energize the counter 41 and a comparator 45 through the review latch 44. Counter 41 provides a count and energization of count indication light 14. The hour count is compared with the count stored in count storage 42 and when the two are equal, review latch 44 is opened. At the time the clock is pulsing for the count, the home owner observes the number of flashes of the indicator light 14 to inform him of the number of hours stored for the offset time period.

Figure 5:
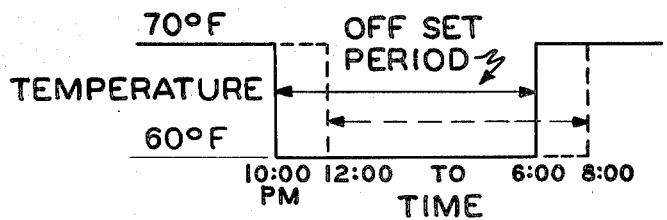
FIG. 5 is a graphical showing of changes in the offset program.

Once an offset program is stored in count storage 42, this offset operation takes place every twenty-four hours from the time the twenty-four hour clock was started at zero. The output of the clock 24 is compared with counter storage 42 by the output comparator 46 to maintain an offset output at 30 for the stored offset time period. For example, if the home owner had set the program by switch 16 at 10:00 P.M. for an eight hour time program, or eight flashes of the indicator light 14, the offset program repeats itself for eight hours of energy saving from 10:00 P.M. to 6:00 A.M. every twenty-four hours always starting at 10:00 P.M. as shown in FIG. 5.

By means of switches 50 and 51, the offset time program can be moved or changed ahead or back, respectively. A window timing circuit or driving means 55 receives a repetitive signal or timing pulse T and three different frequency signals through gates 52, 53 and 54 from timer 31. Depending upon which of the three control switches 60, 61 and 63 are closed and for the length of this closure an output conductor 59 controls the signal source output at 32 to shift or drive the twenty-four hour clock 34 to effectively have a different starting time.

Figure 4:
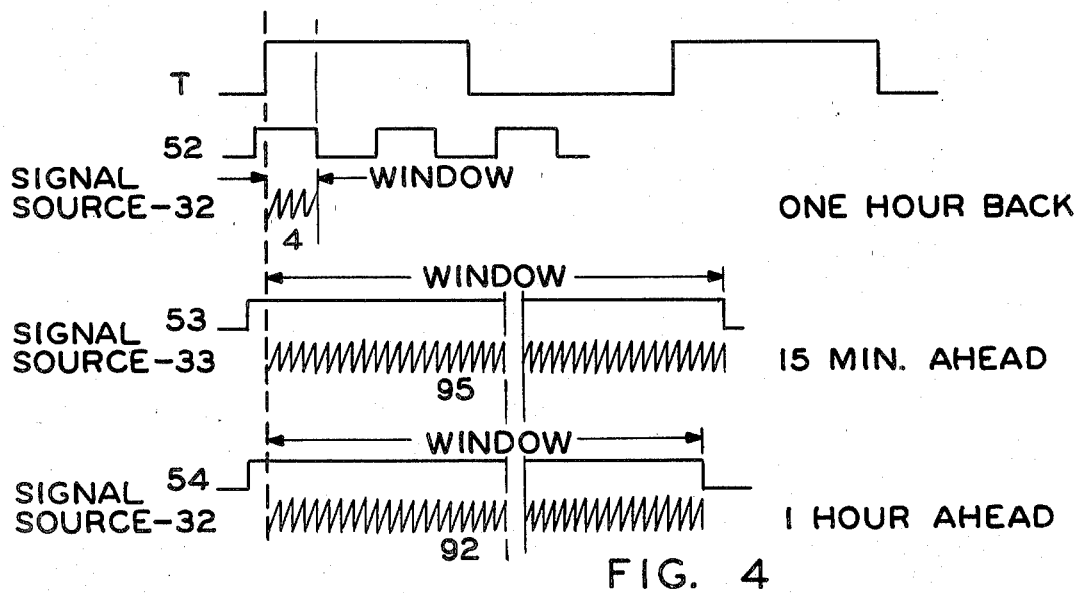
FIG. 4 is a graphical showing of the timing operation of the electrical voltage.

When switch 50 is closed to move the stored program ahead, control switch 60 is closed to allow the signal of window timing circuit 55 to admit the output 32 to the twenty-four hour clock. The window timing circuit 55 receives the timing signal T and the timing signal of gate 54 which allows a 92 pulse signal from output 32. The 92 pulse signal drives the twenty-four hour clock 34 twenty-three hours ahead each time a repetitive action of the pulse of the signal T is allowed to pass through control switch 60. At the same time indicator light 15 is momentarily energized for each pulse of signal T. The home owner counts the flashes of light 15, so the number of hours that the program is set ahead can be selected. The window timing circuit schematic is shown in FIG. 4 to show how the window or time interval is established by the beginning of the pulse of signal source T and is terminated by the end of the pulse of the signal source from gate 54 for the 92 pulses of signal source 32. By driving the twenty-four hour clock through a twenty-three hour sequence with each window timing pulse, the setback program is advanced ahead one hour. If the timing program, as previously mentioned, were set for 10:00 P.M., as shown in FIG. 5, with two pulses of the window control, and thus two flashes of light 15, the starting time of the program is changed to 12:00 P.M. and the offset period is shifted ahead two hours.

A similar operation takes place for setting the program back when switch 51 is closed to energize control switch 61 to allow for the operation of the window timing circuit to produce four signal pulses of output 32 to the twenty-four hour clock. Thus, when the timing pulse T and the pulse from gate 52 is combined as shown in FIG. 4, a window exists of sufficient length to allow four of the signal pulses from output 32 to drive the twenty-four hour clock. The clock is driven one hour ahead to change the start of the setback in the time program from 10:00 P.M. to 9:00 P.M.

A similar operation can take place for setting the program ahead in 15 minute intervals by closing both switches 50 and 51 to energize gate 62 which deactivates gates 63. Control switch 64 allows for a window shown in FIG. 4 sufficient to pass 95 signal pulses from output 32 to drive the twenty-four hour clock twenty-three and three-fourths hours and thus set the program ahead 15 minutes for each pulse of the timing signal T that is allowed to pass through the window control switches.

OPERATION OF THE PREFERRED EMBODIMENT

Assuming that the home owner desired to have the temperature in space 12 of FIG. 1 offset by 12° during the night time, an offset time program can be stored in the thermostat. By closing switch 35 by pushing the button on the front of the thermostat at some particular time, for example, 10:00 P.M. Assuming that an eight hour setback time period was desired, switch 35 is held closed for eight flashes of indicator light 14. Upon closing switch 35, twenty-four hour clock 34 is started at zero and as the clock runs at a fast rate, each hour output is counted on the counter 41 to provide an output over circuit 70 to energize indicator light 14 on the front of the thermostat. By counting the flashes of the indicator light until the number 8 was reached, switch 35 is opened and the eight hour period of time is stored in count storage 42.

Immediately, with the twenty-four hour clock now running from its time zero at 10:00 P.M., output comparator 46 compares the clock time with the count storage. Output 30 to the bridge circuit of the thermostat modifies the control point temperature to some lower selected temperature depending on how much offset was selected at 13 to maintain the lower temperature in space 12. If this were allowed to operate as programmed, the lower temperature would continue until 6:00 A.M. in the morning.

Assuming that the operator wanted to change the stored temperature offset program (shown in FIG. 5) of 10:00 P.M. to 6:00 A.M., to 12:00 P.M. to 8:00 A.M., in other words, to move the program ahead two hours, by closing switch 50 on the front of the thermostat, as shown in FIG. 3, the timer is driven through a cycle of twenty-three hours for each pulse of indicator light 15. By holding switch 50 closed for two flashes of indicator light 15, the twenty-four hour clock is two hours back to allow for the setback to occur between 12:00 P.M. and 8:00 A.M.

If the setback program is to be moved from 10:00 P.M. to 9:00 P.M., switch 51 is closed to provide for the output of the timing circuit at 32 to enter the twenty-four hour clock for each pulse of the circuit timing signal T and thus each flash of the indicator light 15. One flash of light 15, and the clock is moved ahead one hour to have a start time of 9:00 P.M.

To move the program ahead in 15 minute intervals both switches 50 and 51 are closed simultaneously to provide for the output to operate the control of the twenty-four hour clock in increments of 95 pulses, or twenty-three and three-fourths hours ahead to move the clock ahead in 15 minute intervals for each flash of the indicator light 15.

At any time a review of the hours stored in the program can be made by closing switch 43 on the thermostat and counting the number of flashes of the indicator light 14.

The embodiment of the invention in which an exclusive property or right is claimed are defined as follows:

1. A thermostat adapted to be connected to a remote temperature conditioning apparatus for controlling the temperature of air in a space to maintain a first temperature during a first period of time and a second temperature during a second period of time, comprising, temperature responsive means responsive to a space temperature, control circuit means adapted to be connected to the temperature conditioning apparatus, means connecting said temperature responsive means to said control circuit means for establishing a control temperature to maintain the first temperature in the space, single button manually settable electronic time interval means for providing a second period of time, means connecting said time interval means to said control circuit means to change said control temperature to maintain a second temperature in the space for said second period of time at a predetermined starting time each day, and driving means connected to said settable electronic time interval means for changing said predetermined starting time of said second period of time.

2. The invention of claim 1 wherein said settable electronic time interval means comprises a twenty-four hour clock which is set at zero at the time when the start of said second time period is selected, and said driving means comprises a source of signal pulses to be selectably connected to said twenty-four hour clock to shift the zero starting time of said clock and thus the starting time of said second period of time.

3. The invention of claim 2 wherein said source of signal pulse is controlled by a circuit comprising first signal source, second signal source, and circuit means for receiving said first and second signal sources to provide an output of said signal pulses having a duration equal to the time between the start of said first signal source and the end of said second signal source.

4. The invention of claim 3, comprising indicator means, circuit means connecting said first signal source to said indicator means to provide an indication time shift of said twenty-four hour clock.

5. The invention of claim 2, wherein said electronic time interval means is a digital twenty-four hour clock which steps ahead a predetermined time increment for each pulse received, manually operated switch means connecting said source of signal pulses to said electronic time interval means, and further circuit means connecting said source of signal pulses to said switch means to control the number of pulses to said time interval means for selecting the amount of shift in said second period of time.

6. The invention of claim 2 wherein said twenty-four hour clock is driven by a normal source of signal pulses from a timer means, and wherein said shifting source of signal pulses is a higher frequency signal pulse for rapidly shifting said twenty-four hour clock.

7. The invention of claim 6, wherein said normal source has a frequency of one pulse each one-eighth of an hour, and wherein said shifting source has a frequency of 32,768 Hz.

8. An improvement in an energy saving thermostat, comprising, a temperature responsive means adapted to respond to space temperature, a control circuit connected to said responsive means and having an output adapted to be connected to a temperature conditioning apparatus for changing the temperature of the space, temperature control point setting means connected to said control circuit to select the temperature being controlled in the space, setback means connected to said control circuit to select a second temperature to be controlled in the space, timer means connected to said setback means for selecting a time period at a predetermined starting time during which the second temperature is to be maintained having manually operated time interval counter means providing an electric pulse for each increment of time for setting said timer, and indication means providing an indication of each pulse for counting said increment of time, the improvement comprising manually operated means for shifting the starting time of said manually operated time interval counter means and thus changing said predetermined starting time of said time period during which said second temperature is maintained.

* * * * *